US006990673B2

(12) United States Patent
Lee

(10) Patent No.: US 6,990,673 B2
(45) Date of Patent: Jan. 24, 2006

(54) OPTICAL DISC LOADING USING TWO DETECTING ARMS AND AN EDGE SENSOR

(75) Inventor: Cheng-Fu Lee, Taipei (TW)

(73) Assignee: Lite-On It Corporation, Taipei (TW)

( * ) Notice: Subject to any disclaimer, the term of this patent is extended or adjusted under 35 U.S.C. 154(b) by 388 days.

(21) Appl. No.: 10/191,340

(22) Filed: Jul. 8, 2002

(65) Prior Publication Data

US 2003/0099167 A1 May 29, 2003

(30) Foreign Application Priority Data

Nov. 23, 2001 (TW) ............................... 90129095 A

(51) Int. Cl.
*G11B 17/04* (2006.01)
(52) U.S. Cl. ...................................... 720/623; 720/626
(58) Field of Classification Search ............. 369/30.27, 369/30.36, 77.1, 77.2, 75.1, 75.2, 53.2, 53.37; 720/601, 620, 619, 621, 622, 623, 624, 625, 720/626
See application file for complete search history.

(56) References Cited

U.S. PATENT DOCUMENTS

| 4,498,162 | A | * | 2/1985 | Schatteman | 720/620 |
| 5,097,460 | A | * | 3/1992 | Camps et al. | 720/621 |
| 5,113,388 | A | * | 5/1992 | Yamada et al. | 720/704 |
| 5,173,894 | A | * | 12/1992 | Kido | 720/623 |
| 5,416,763 | A | * | 5/1995 | Ohsaki | 720/623 |
| 6,288,982 | B1 | * | 9/2001 | Kato | 369/30.36 |

* cited by examiner

*Primary Examiner*—Tan Dinh
(74) *Attorney, Agent, or Firm*—Thomas, Kayden, Hr Horstemeyer & Risley

(57) ABSTRACT

A disc loading device for an optical disc drive that discriminates between standard sized optical discs and other objects. In the disc-loading device, two one-degree-of-freedom detecting arms are disposed near the slot of the optical disc drive. An edge sensor including an emitting component and a receiving component is disposed between two detecting arms. A control unit receives data from the detecting arms and the edge sensor when the edge sensor detects the periphery of an object inserted into the optical disc drive. The data is used to calculate the size of the inserted object. By comparing the measured size with the standard sizes of optical discs, the disc loading device can determine whether or not the inserted object is an optical disc or another object. If the control unit determines that the inserted object is not an optical disc, the object is unloaded.

20 Claims, 5 Drawing Sheets

OPTICAL DISC LOADING USING TWO DETECTING ARMS AND AN EDGE SENSOR

BACKGROUND OF THE INVENTION

1. Field of the Invention

The present invention relates to a slot-in disc drive, and in particular to a disc loading device for use in a slot-in optical disc drive for receiving optical discs of different sizes while unloading other objects inserted into the drive.

2. Description of the Prior Art

Slot-in optical disc drives allow users to conveniently load and unload optical discs. Slot-in optical disc drives can be implemented in various electronic devices, for example notebook computers and car CD players. As for the operation of these disc drives, rollers or other means are used to apply force to the circular periphery of the optical disc, thereby loading or unloading optical discs.

Conventional slot-in optical disc drives have disadvantageous characteristics. For example, if a thin foreign body, such as an ID card, credit card, or phone card, is mistakenly inserted into the slot instead of an optical disc, the drive's sensor may fail to detect its presence. Subsequently, the foreign body may be jammed into the device and damage the disc drive when another optical disc or object is inserted.

Many ideas have been proposed to solve this problem. In the prior art, opposed-mode sensors, for example photo-interrupters, are usually used to detect optical discs. The opposed-mode sensors transmit signals to the control unit of the disc drive indicating when the periphery of the disc reaches the sensors. The disc drive can then function in accordance with these signals. However, if many opposed-mode sensors are used to discriminate between optical discs and other objects, the structure of the drive becomes complex and costly. On the other hand, if only a few opposed-mode sensors are disposed in the disc drive, the discrimination between optical discs and other objects cannot be performed accurately. In addition, it is possible for a user to insert an optical disc or other object into the disc drive at an angle, which also can result in inaccurate discrimination.

Accordingly, there is a need to develop an optical disc drive without these disadvantages.

The present invention provides a novel slot-in optical disc drive that effectively solves the problems mentioned above.

SUMMARY OF THE DISCLOSURE

It is therefore an object of the present invention to provide a disc loading device for an optical disc drive that accurately determines the size of an optical disc inserted into the drive.

It is another object of the present invention to provide a disc loading device for an optical disc drive that discriminates between optical discs with different diameters.

It is yet another object of the present invention of provide a disc loading device for an optical disc drive that unloads an object inserted into the drive when the size of the object does not correspond to that of a standard optical disc.

The present invention provides a disc loading device for an optical disc drive that discriminates between standard sized optical discs and other objects. In an embodiment of the present invention, two one-degree-of-freedom detecting arms are disposed near the slot of the optical disc drive. An edge sensor including an emitting component and a receiving component is disposed between two detecting arms. A control unit receives data from the detecting arms and the edge sensor when the edge sensor detects the periphery of an object inserted into the optical disc drive. The data is used to calculate the size of the inserted object. By comparing the calculated size of the inserted object with the standard sizes of optical discs (e.g. discs with a diameter of 8 cm or 12 cm), the disc loading device can determine whether or not the inserted object is an optical disc or another object. If the control unit determines that the inserted object is not an optical disc, the object is unloaded. The present invention thus provides a novel solution to the problem of the prior art.

In another embodiment, the present invention provides a slot-in optical disc drive having a disc loading device adapted to discriminate between different types of optical discs. The slot-in optical disc drive of the present invention comprises a chassis, two detecting arms, two guide pins integrally formed on the corresponding detecting arms, a roller assembly and an edge sensor. The two detecting arms are rotatably disposed in the chassis and adapted to contact the circular periphery of an optical disc during loading and unloading of the optical disc.

The edge sensor is disposed between the two detector arms, and a signal is transmitted to the control unit when the circular periphery of optical disc is detected. In response to the signal, the control unit calculates the size of the optical disc using the data from the two detecting arms and the edge sensor. In an embodiment of the present invention, if an object with a calculated size that does not correspond to that of a standard disc is inserted into the optical drive, the control unit controls the roller assembly to unload the object.

The present invention also provides a method of discriminating between optical discs and other objects inserted into a optical disc drive, the method comprising the steps of: detecting when the periphery of an inserted object reaches a fixed point to generate first position data; detecting two more points on the periphery of the inserted object with two detecting arms to generate second and third position data; calculating the size of the inserted object with the first, second and third position data; and comparing the calculated size according to the sizes of standard optical discs to determine whether the inserted object is an optical disc. In a preferred embodiment of the present invention, if the inserted object is not an optical disc, an additional step of unloading the object is performed.

The apparatus and method of the present invention may be implemented at low cost. Furthermore, the apparatus and method of the present invention can accurately discriminate between standard sized optical discs and other objects.

BRIEF DESCRIPTIONS OF THE DRAWINGS

The present invention can be fully understood from the following detailed description and preferred embodiment with reference to the accompanying drawings in which:

FIG. 1 shows a flow chart illustrating the operation of the disc loading device of an optical disc drive according to an embodiment of the present invention;

FIG. 2 schematically shows a perspective view of the disc loading device of optical disc drive according to an embodiment of the present invention;

FIG. 3 schematically shows a perspective view of the roller assembly according to the embodiment illustrated in FIG. 3;

DETAILED DESCRIPTION OF THE PREFERRED EMBODIMENTS

For purpose of the present invention, the term "optical disc drive" or "disc drive" as used herein, shall include CD-ROM, CD-RW, DVD-R/RW, and DVD+RW drives, combo drives, external drives, and slim-type drives, as well as all other optical media recorders and players.

The following is a detailed description of preferred embodiments of the present invention. The description is not to be taken in a limiting sense, but is made merely for the purpose of illustration.

Figure 2:
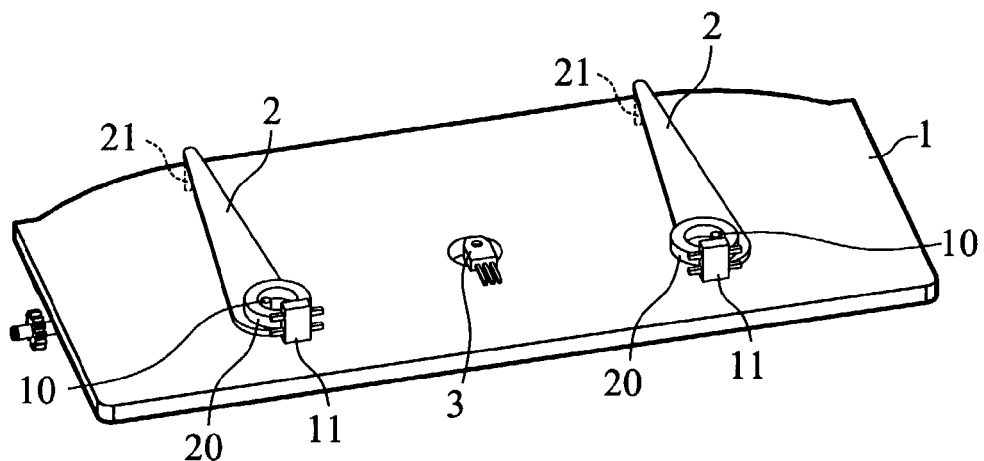

The present invention provides a disc loading device for an optical disc drive. FIG. 2 schematically shows a perspective view of the disc loading device of the optical disc drive according to an embodiment of the present invention.

As shown in FIG. 2, the chassis 1 is used to support the components of the optical disc drive. In accordance with the present invention, the disc loading device has two detecting arms 2, an edge sensor 3, a control unit (not shown), and a roller assembly 4 which loads and unloads the optical discs.

Figure 4:
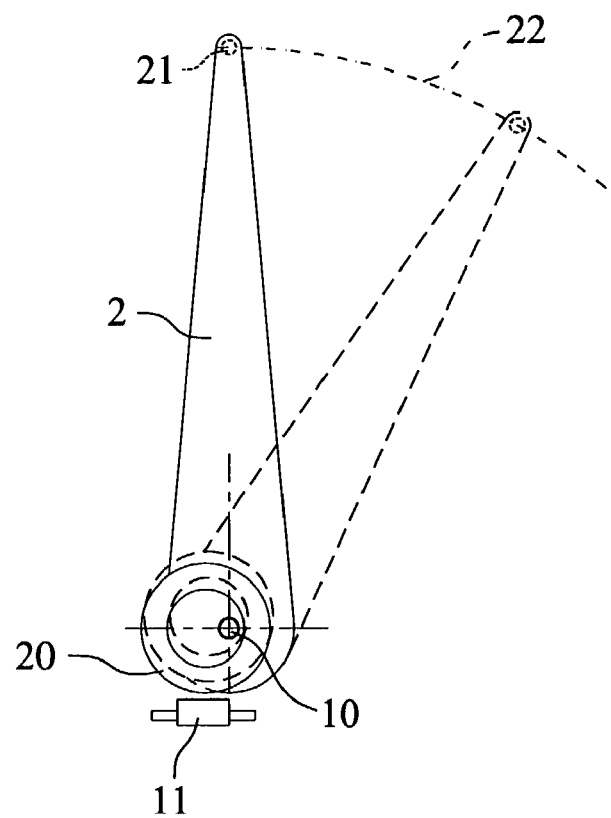
FIG. 4 illustrates the detecting arms move in a circular arc during loading and unloading of optical discs.

The two detecting arms 2 (as shown in detail in FIG. 4) are rotatably pivoted to two axles 10 and move in a circular arc 22 during loading and unloading operations. Magnet rings 20 are respectively disposed on one end of each detecting arm 2. Guide pins 21 are integrally formed with the other end of each detecting arm 2. A Hall element 11 is disposed on the chassis 1 near each magnet ring 10. The Hall element 11 is used to detect the magnetic field. When the distance between the magnet ring 10 and the Hall element 11 is changed, the Hall element 10 can detect the variation of the magnetic field and transmit a signal corresponding to the position of the detecting arm to the control unit of the optical disc drive.

The edge sensor 3 includes an emitting component and a receiving component. For simplicity, only the emitting component is shown in the drawing.

Figure 3:
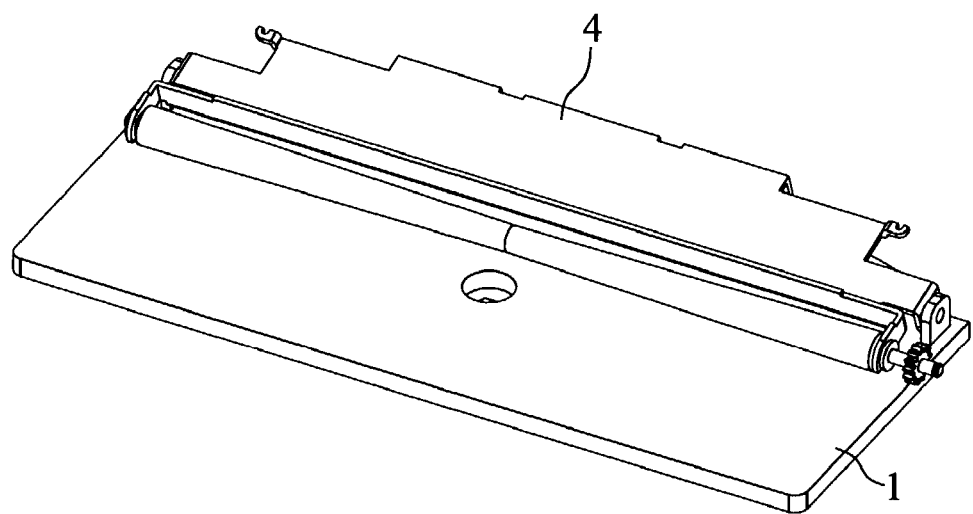

FIG. 3 schematically shows a perspective view of the roller assembly 4 according to the present invention. The roller assembly is similar to those of the prior art, so a detailed description of the structure is omitted.

Figure 1:
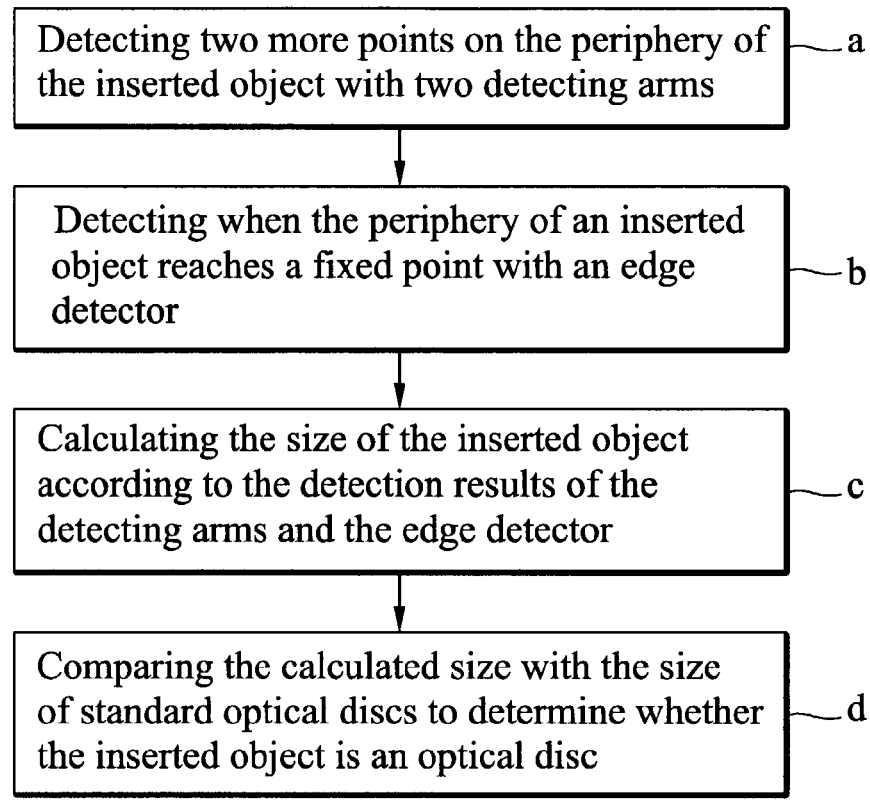

FIG. 1 is a flow chart illustrating the operation of the disc loading device of an optical disc drive according to an embodiment of the present invention. First, when an optical disc is inserted into the optical disc drive, the guide pins of two detecting arms contact a circular periphery of the optical disc. Then, when the optical disc is pushed further into the disc drive, the periphery of object triggers the edge sensor, which is located at a known position. During the loading operation, the clearance between the magnet ring 10 and Hall element 11 is changed. When the sensor is triggered, the position data of the two detecting arms is transmitted by the Hall elements 11 to the control unit. According to the position data of the detecting arms and the edge sensor, the control unit can calculate the size of the optical disc by a principle of geometry. In a preferred embodiment, the position data of the edge sensor and the two detecting arms constitute a set of three points on the periphery of the inserted optical disc. It is well known in geometry that three points on the periphery of a circular object define an arc, and that the arc of a circle can be used to calculate its radius and diameter. Finally, the size of optical disc is compared to that of standard optical discs (e.g. optical discs having a diameter of 8 cm or 12 cm). If the size of optical disc matches that of a standard optical disc, the optical disc drive continues normal operation. The sizes of standard optical discs may be stored in a register or memory.

On the other hand, if an object with a size or shape different than that of a standard optical disc is inserted into the drive, the position data of the two detecting arms will differ from that measured for a standard optical disc. As a result, the control unit will calculate a different size for an object that does not match the size of a standard optical disc. It is understood that the calculated size of a non-circular object will not be accurate. However, this does not impact the functioning of the disc loading device of the present invention. Accurate or not, if the calculated size of the inserted object does not match the size of a standard optical disc, the control unit will control the roller assembly to unload the object. Thus, damage to the disc drive can be prevented.

The edge sensor 3 may be a photo-interrupter including an emitting component and receiving component. The edge sensor 3 is disposed between the two detecting arms 2, and is adapted to generate a signal when the edge sensor 3 detects the periphery of the optical disc or other object inserted into the disc drive.

Figure 5B:
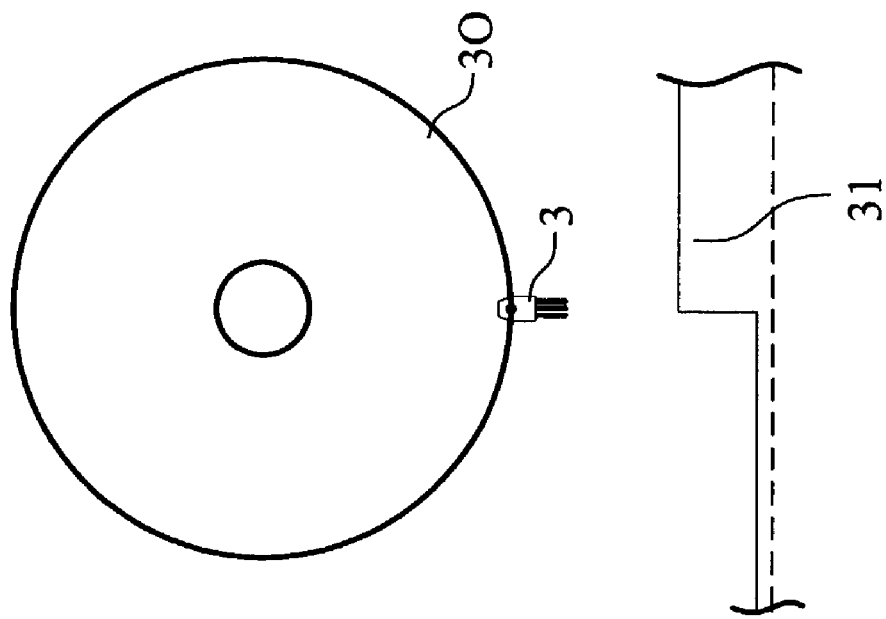
FIG. 5b illustrates the detection signal generated by the edge sensor when an optical disc is detected.
Figure 5A:
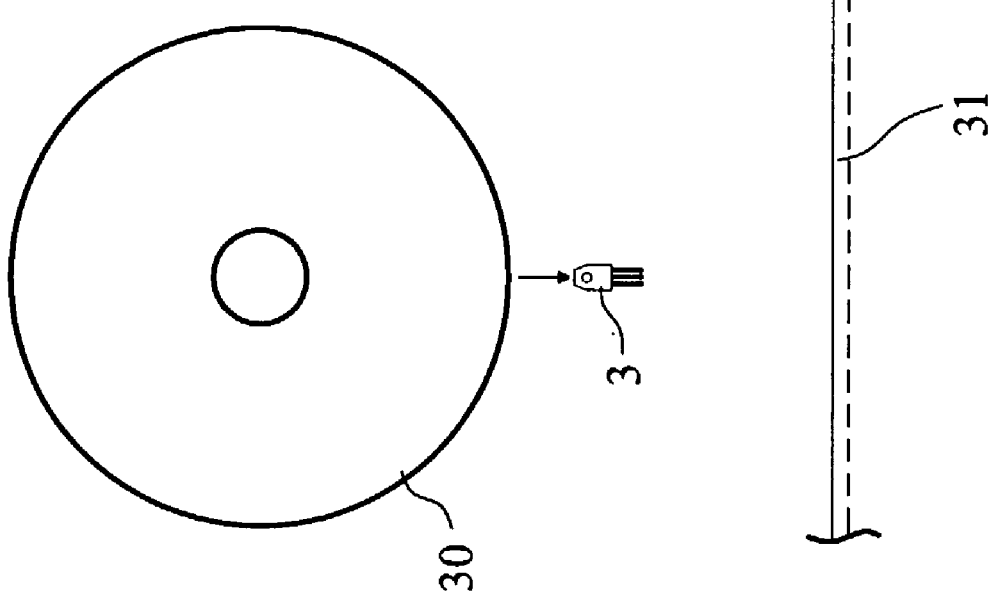
FIG. 5a illustrates the detection signal generated by the edge sensor when no optical disc is detected.

FIGS. 5a and 5b illustrate the operation of an embodiment of the disc loading device of the present invention when an optical disc 30 is inserted into an optical drive. FIG. 5a illustrates a detection signal 31 generated by the edge sensor 3 at low level, indicating that the edge sensor 3 hasn't detected the optical disc 30 yet. As shown in FIG. 5b, when the circular periphery of optical disc 30 interrupts the sensing path of edge sensor 3, it also triggers the edge sensor 3. Then, the detection signal 31 generated by the edge sensor 3 stands at high level. The control unit receives the detection signal 31 and the position data of the two detecting arms. Because three points define an arc, in a preferred embodiment the control unit can calculate the size of optical disc 30 according to a principle of geometry using the positions of the guide pins 21 and the edge sensor 3.

Figure 6:
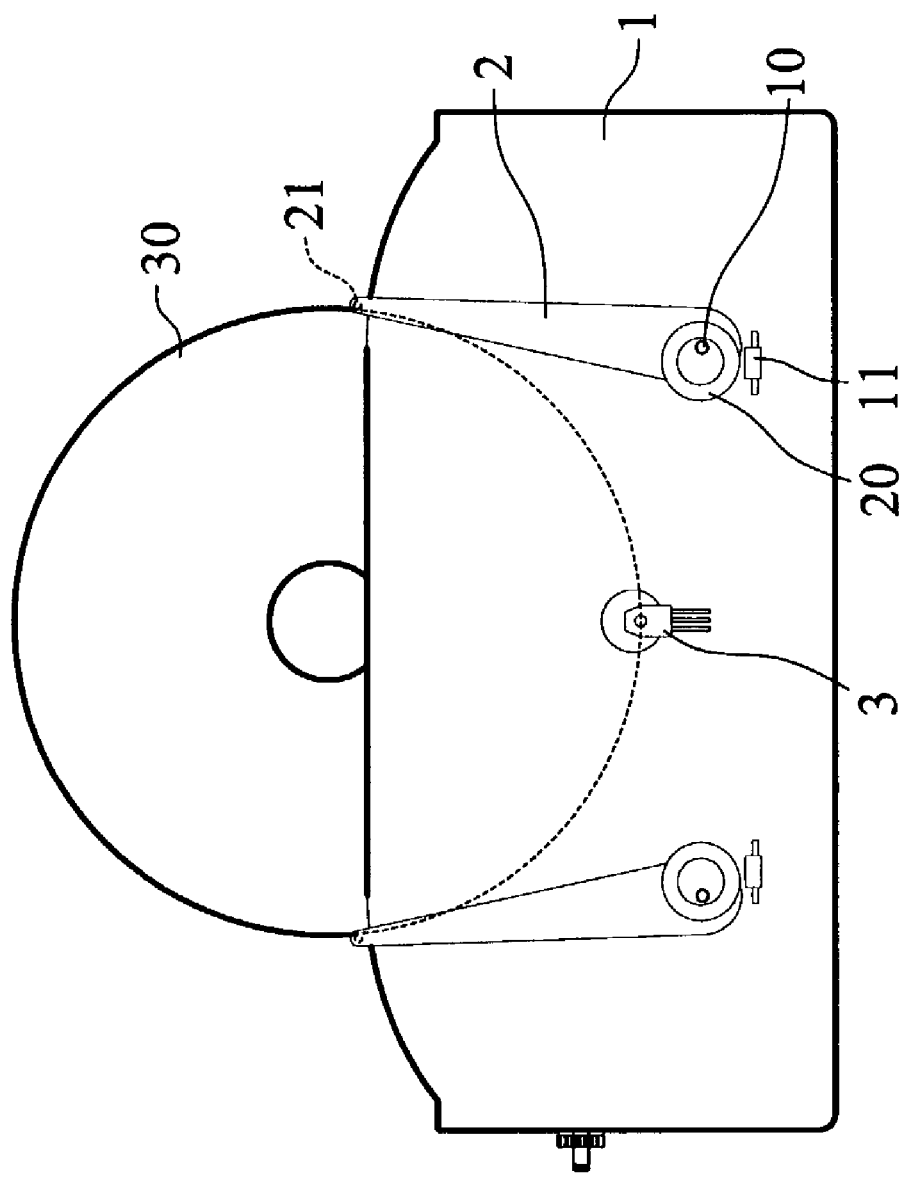
FIG. 6 illustrates the relationship of two detecting arms, the edge sensor and an optical disc when an 8 cm disc (4 cm in radius) is inserted.
Figure 7:
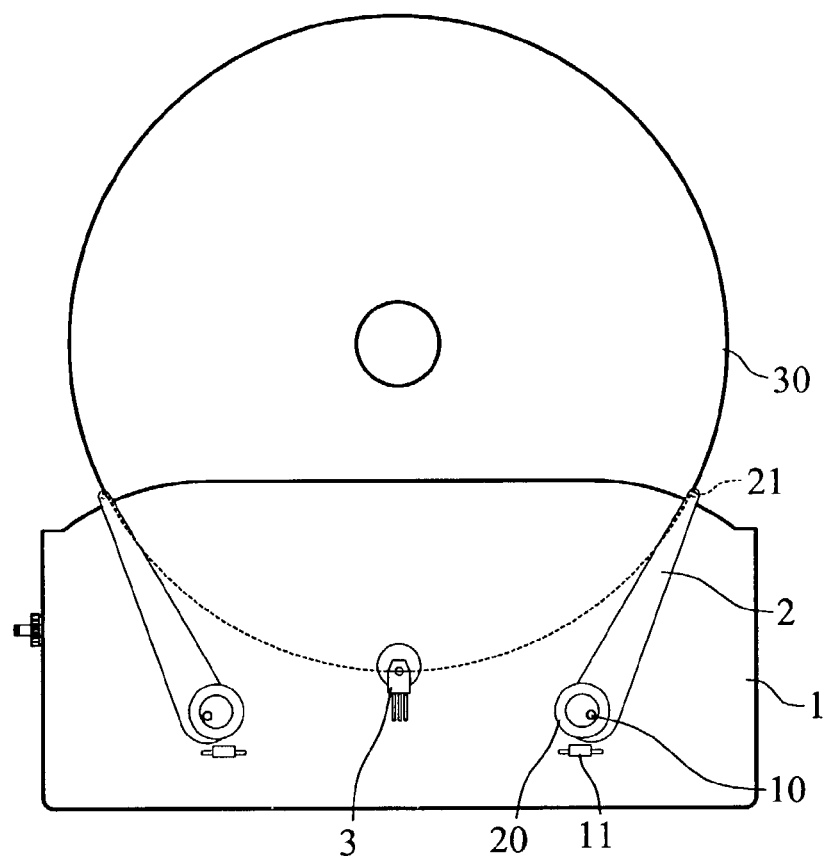
FIG. 7 illustrates the relationship of two detecting arms, the edge sensor and an optical disc when a 12 cm disc (6 cm in radius) is inserted.

FIG. 6 and FIG. 7 illustrate the relationship of two detecting arms, the edge sensor and 8 cm or 12 cm optical discs. In an embodiment of the present invention, the optical disc 30 is inserted, the optical disc 30 contacts the two guide pins 21 and pushes the detecting arms 2 to rotate. Thus, the two guide pins 21 of detecting arm 2 contact and move along the circular periphery of the optical disc 30. When the edge sensor 3 detects the circular periphery of optical disc 30, the radius of optical disc 30 is calculated from the position data of the edge sensor 3 and the two detecting arms 2. In FIGS. 6 and 7, the positions of the guiding pins on the periphery of the optical disc 30 differ according to the radius of the disc. This in turn alters the rotation of the detecting arms 2 and the positions of the magnetic rings 10. As a result, the Hall element 11 detects a difference in the magnetic field and transmits a corresponding signal to the control unit. The according to this position data, the control unit can calculate the positions of the guiding pins. The position of the edge sensor is fixed and known. With the set of position data, the radius and diameter of the optical disc 30 can be calculated. Thus, the disc loading apparatus of the present invention can discriminate between optical discs of different sizes.

In an embodiment of the present invention, if the calculated radius matches that of a standard disc, i.e. 4 cm or 6 cm, the control unit will control the roller assembly 4 to continue the loading operation. Otherwise, the control unit will control the roller assembly to unload the object being inserted. Thus, the disc loading apparatus of the present invention can discriminate between optical discs of standard sizes and other objects.

The position of the detecting arms 2 is symmetrical in the embodiments illustrated in the drawings, but other arrangements are possible. Furthermore, it is understood that the size of the object inserted into the drive may be calculated in various ways known in the art from position data from the edge sensor and two detecting arms. For example, the actual coordinates of the edge sensor and two guiding pins may be used to calculate the arc, as disclosed above. Alternately, the orientation or angle of rotation of the detecting arms when the edge sensor is triggered may also serve as position data for use in calculating the size of the inserted object.

Figure 8:
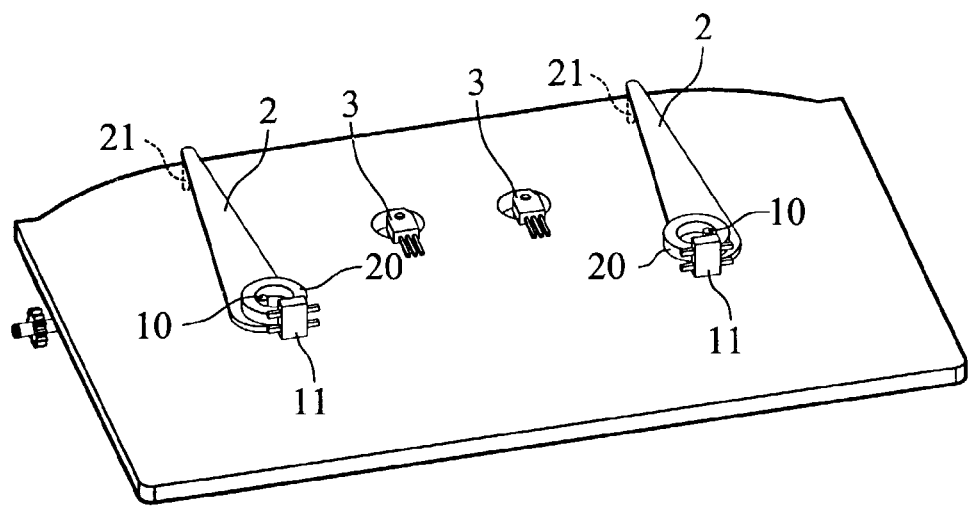
FIG. 8 schematically shows a perspective view of another embodiment of the present invention.

FIG. 8 schematically shows a perspective view of another embodiment of the present invention. To enhance discrimination of non-circular foreign body, the chassis 1 may be further comprised of a plurality of edge sensors 3. For example, in FIG. 8, two edge sensors 3 are disposed between the detecting arms 2. In this embodiment, the two edge sensors 3 are symmetrically disposed such that a standard sized optical disc inserted into the drive would trigger the sensors simultaneously. The control unit calculates the size of an inserted objected according to the position data of the two edge sensors 3 and the two detecting arms 2. If an irregularly shaped object is inserted into the drive and triggers only one of the two edge sensors 3, the control unit determines that the inserted object is not a standard sized optical disc notwithstanding the position data of the two detecting arms 2.

According to the present invention, the disc loading device for optical disc drive is able to calculate the size of an optical disc inserted into the drive, and can discriminate between optical discs of standard size. Furthermore, if another object, for example a credit card or phone card, is inserted, the disc loading device is able to determine that it is not a standard sized optical disc and unload the item, which prevents the disc drive from being damaged.

While the invention has been described with reference to a preferred embodiment, the description is not intended to be construed in a limiting sense. It is therefore contemplated that the appended claims will cover any such modifications or embodiments as may fall within the scope of the invention defined by the following claims and their equivalents.

What is claimed is:

1. A slot-in optical disc drive comprising:
   a chassis having a slot for receiving an object;
   two detecting arms rotatably disposed in the chassis in proximity of the slot and adapted to contact and move along the periphery of the object when it is inserted into the slot, the two detecting arms generating first and second position data, respectively;
   a first edge sensor disposed in the chassis between the two detecting arms for detecting the periphery of the object and generating third position data;
   a control unit for receiving the first, second and third position data when the first edge sensor detects the periphery of the optical disc, calculating the size of the object according to the first, second, third position data, and a principle of geometry that three points on the periphery of a circle define an arc for calculating its radius;
   a second edge sensor for detecting the periphery of object and generating a fourth position data, and the control unit receiving the fourth position data, an updated second position and an updated third position data when the second edge sensor detects the periphery of the optical disc, calculating the size of the object according to the fourth, second, third position data, and a principle of geometry that three points on the periphery of a circle define an arc for calculating its radius; and
   a roller assembly controlled by the control unit for loading and unloading the object;
   wherein the control unit comparing the size of the object with standard sizes for optical discs, and the control unit controls the roller assembly to continue loading the object when it is standard sized, and controls the roller assembly to unload the object when it is not standard sized.

2. The slot-in optical disc drive as claimed in claim 1, the wherein the object is an optical disc.

3. The slot-in optical disc drive as claimed in claim 1, wherein each detecting arm comprises a guide pin for contacting the object.

4. The slot-in optical disc drive as claimed in claim 1, wherein each detecting arm is provided with a magnetic device.

5. The slot-in optical disc drive as claimed in claim 4, wherein each detecting arm further comprises a magnetic sensor for detecting variations in the magnetic field resulting from movement of the magnetic device.

6. The slot-in optical disc drive as claimed in claim 5, wherein the magnetic sensors are Hall elements.

7. The slot-in optical disc drive as claimed in claim 1, wherein the first edge sensor is an opposed mode sensor.

8. The slot-in optical disc drive as claimed in claim 1, wherein the second edge sensor is an opposed mode sensor.

9. A disc loading device for a slot-in optical disc drive comprising:
   two rotatably disposed detecting arms adapted to contact and move along the periphery of an object when it is inserted into the optical disc drive, the two detecting arms generating first and second position data, respectively;
   a first edge sensor disposed between the two detecting arms for detecting the periphery of the object and generating third position data;
   a control unit for receiving the first, second and third position data when the first edge sensor detects the periphery of the object and calculating the size of the object according to the first, second, third data, and a principle of geometry that three points on the periphery of a circle define an arc for calculating its radius; and
   a second edge sensor for detecting the periphery of object and generating a fourth position data, and the control unit receiving the fourth position data, an updated second position and an updated third position data when the second edge sensor detects the periphery of the optical disc, calculating the size of the object according to the fourth, second, third position data, and a principle of geometry that three points on the periphery of a circle define an arc for calculating its radius.

10. The disc loading device as claimed in claim 9, further comprising a roller assembly controlled by the control unit for loading and unloading the object.

11. The disc loading device as claimed in claim 10, wherein the control unit compares the size of the object with standard sizes for optical discs, and controls the roller assembly to continue loading the object when it is standard sized, and controls the roller assembly to unload the object when it is not standard sized.

12. The disc loading device as claimed in claim 9, the wherein the object is an optical disc.

13. The disc loading device as claimed in claim 9, wherein each detecting arm comprises a guide pin for contacting the object.

14. The disc loading device as claimed in claim 9, wherein each detecting arm is provided with a magnetic device.

15. The disc loading device as claimed in claim 14, wherein each detecting arm further comprises a magnetic sensor for detecting variations in the magnetic field resulting from movement of the magnetic device.

16. The disc loading device as claimed in claim 15, wherein the magnetic sensors are Hall elements.

17. The disc loading device as claimed in claim 9, wherein the first edge sensor is an opposed mode sensor.

18. The slot-in optical disc drive as claimed in claim 9, wherein the second edge sensor is an opposed mode sensor.

19. A method of discriminating between standard sized optical discs and other objects inserted into an optical disc drive, the method comprising the steps of:

detecting when the periphery of an inserted object reaches a first fixed point to generate a first position data;

detecting two more points on the periphery of the inserted object with two detecting arms to generate a second and a third position data;

calculating the size of the inserted object according to the first, second, third position data, and a principle of geometry that three points on the periphery of a circle define an arc for calculating its radius;

detecting when the periphery of the inserted object reaches a second fixed point to generate a fourth position data;

detecting two more points on the periphery of the inserted object with two detecting arms to generate an updated second position data and an updated third position data;

calculating the size of the inserted object according to the fourth position data, the updated second position, the updated third position data, and a principle of geometry that three points on the periphery of a circle define an arc for calculating its radius; and comparing the calculated size with the size of standard optical discs to determine whether the inserted object is a standard sized optical disc.

20. The method as claimed in claim 19, further including the step of unloading the inserted object if the inserted object is not a standard sized optical disc.

* * * * *